Sept. 28, 1954
F. K. H. NALLINGER
2,690,168
PREHEATING SYSTEM FOR ENGINES
Filed Jan. 13, 1950
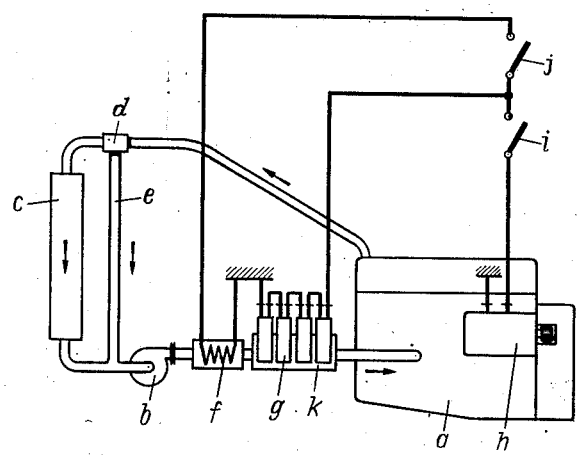
Fig.1
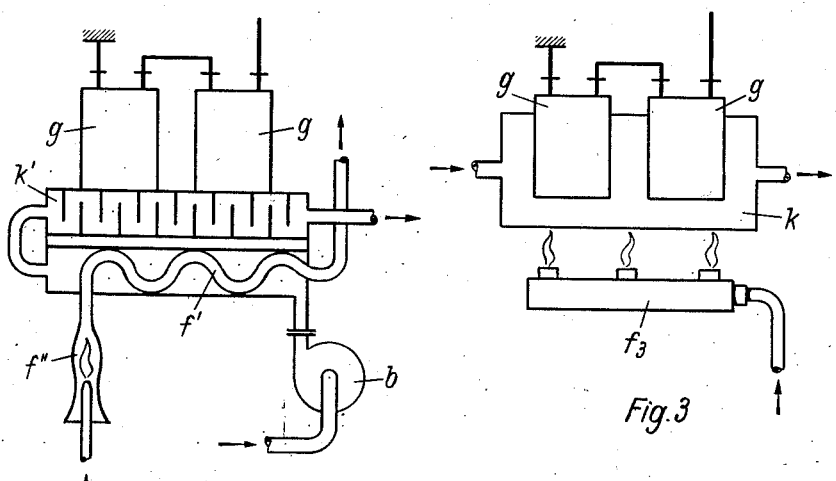
Fig.2
Fig.3
INVENTOR
FRIEDRICH K. H. NALLINGER
BY:
Haseltine, Lake & Co.
AGENTS Patented Sept. 28, 1954

2,690,168

UNITED STATES PATENT OFFICE 2,690,168

PREHEATING SYSTEM FOR ENGINES

Friedrich K. H. Nallinger, Stuttgart, Germany, assignor to Daimler-Benz Aktiengesellschaft, Stuttgart-Unterturkheim, Germany Application January 13, 1950, Serial No. 138,278

3 Claims. (Cl. 123—142.5)

This invention pertains to a plant comprising an electric battery, particularly in conjunction with an internal combustion engine, and especially in motor vehicles. Purpose of this invention is first a better utilization of the battery for the supply of electric energy, further an easier starting of the internal combustion engine in all cases where an electric starter is provided for this purpose. Another particular aim of this invention is to obtain a more economical heating of the electric battery.

Internal combustion engines such as used for the propulsion of motor vehicles being started by a starter receiving its electric energy from a battery will, especially under low temperature conditions and when the battery is cold, involve the disadvantage that due to the heavy discharge of electricity needed for the starting operation, the supply of electric energy decreases considerably after a very short time, thus rendering starting very difficult or even impossible.

This disadvantage can be eliminated, and starting operation can be rendered considerably easier by heating the battery, for a heated battery supplies considerably larger quantities of current resulting in a faster, stronger and longer operation of the starter. This is particularly important in winter, i. e. when low outdoor temperature conditions necessitate in any case a longer duration of starting operation.

Improvement with regard to an economical heating of the battery is obtained, according to a feature of this invention, in that the heat generated by a heating device designed for another purpose, can also and additionally be utilized for heating the battery. For this purpose, e. g. the cooling water heated by a firing up device can be, in particular, used to make the starting operation of the motor car engine easier. The heating energy may hereby be supplied by the battery itself or by another heating source, e. g. a burning lamp for heating the cooling water or the like. The former offers the advantage to be simple; the advantage of the latter consists in that the heating of the battery and/or of the other device to be heated can be provided independently of the operating conditions of the battery and in that same is not additionally loaded by its supplying heating current, too. The drawing contains some explanatory diagrams of the invention:

Fig. 1 shows a diagrammatic embodiment of the invention where the battery is heated by the cooling water of the internal combustion engine, the heating energy being supplied by the battery itself, Fig. 2 shows another embodiment in which the heating energy is supplied by a heating device which is independent of the battery, and Fig. 3 shows a similar system in which, however, the heat-interchanger provided for the interchange of heat between the cooling water and the battery is directly heated.

In the example of embodiment as per Fig. 1, the cooling water of the water-cooled internal combustion engine $a$, for instance a motor vehicle engine, is caused by a pump $b$ to circulate—and maintained in circulation—when the engine is in operation, through a radiator $c$ or, according to the method of control by a thermostat $d$ through a short circuit line $e$. A heating device $f$ is arranged in a convenient place and suitably in the inlet-pipe of the cooling jacket of the engine. In the example of embodiment, heating device $f$ is an electric heating device fed by battery $g$ which is primarily designed for operating the electric starter. At $i$ and $j$ two switches are indicated: $i$ for the control of the starter and $j$ for the control of the heating device.

The battery $g$ is arranged in a container $k$ through which flows the cooling water heated by the heating device. As soon as the cooling water is heated by heating device $f$ it transmits, in flowing through the container $k$, a portion of its heat to the battery. Thus the container constitutes virtually a jacket included in the cooling medium circuit.

In the example of embodiment as per Fig. 2, the battery is placed on a hollow grate or a hollow ground plate $k'$ which may be provided—as well as the container $k$, if any—with suitably arranged ribs to intensify the interchange of heat between the cooling water and the battery. In this case the cooling water is heated by a heating device consisting of a pipe coil $f'$ into which a heating gas, e. g. lighting gas or the like is admitted. The heating gas is burned up e. g. in a heating lamp or a burner $f''$.

In the example of embodiment as per Fig. 3, the container or any other heat-interchanger $k$ is directly heated by a heating device $f_3$.

What I claim is:

1. In a plant comprising an internal combustion engine provided with a cooling jacket, an electric battery, a cooling fluid circuit for the engine including said jacket, a heating device mounted in heat exchange relation with said circuit for the heating of the cooling fluid, and a jacket surrounding the battery and communicating with said circuit, whereby the battery can be heated by the heated cooling fluid.

2. In a motor vehicle the combination comprising an engine provided with a cooling jacket, a cooling medium circuit composed of said jacket, of a radiator and of pipes connecting same, an electrical heater mounted in heat exchange relation with said cooling medium circuit for heating the cooling medium therein preparatory to the starting of the engine, a battery for starting said engine, means establishing an exchange relation between said cooling medium circuit and said battery, and means including a switch for supplying electrical energy from said battery to said electrical heater.

3. In a motor vehicle the combination comprising an engine equipped with a cooling medium jacket, an electric storage battery adapted to supply electrical energy for starting said engine, a radiator, a jacket surrounding said battery, and conduits including both of said jackets and said radiator in a cooling medium circuit.

References Cited in the file of this patent

UNITED STATES PATENTS

| Number | Name | Date |
| --- | --- | --- |
| 467,573 | Entz et al. | Jan. 26, 1892 |
| 746,289 | Chamberlain | Dec. 8, 1903 |
| 1,266,780 | Edison | May 21, 1918 |
| 1,326,539 | Smith | Dec. 30, 1919 |
| 1,357,598 | Thompson | Nov. 2, 1920 |
| 1,372,864 | Cox | Mar. 29, 1921 |
| 1,992,568 | Connor | Feb. 26, 1935 |
| 2,399,941 | Resek | May 7, 1946 |
| 2,405,143 | Holthouse | Aug. 6, 1946 |
| 2,405,144 | Holthouse | Aug. 6, 1946 |
| 2,405,145 | Holthouse | Aug. 6, 1946 |
| 2,440,369 | Furman | Apr. 27, 1948 |